(12) United States Patent
Stares et al.

(10) Patent No.: US 7,104,281 B2
(45) Date of Patent: Sep. 12, 2006

(54) FLUID FLOW REGULATION

(75) Inventors: James Albert Stares, Norton, MA (US); Jamie Todd Bogumil, Wollaston, MA (US)

(73) Assignee: Dresser, Inc., Addison, TX (US)

( * ) Notice: Subject to any disclaimer, the term of this patent is extended or adjusted under 35 U.S.C. 154(b) by 250 days.

(21) Appl. No.: 10/642,025

(22) Filed: Aug. 15, 2003

(65) Prior Publication Data

US 2005/0034770 A1    Feb. 17, 2005

(51) Int. Cl.
*F16K 3/26* (2006.01)

(52) U.S. Cl. .............................. 137/625.33; 137/625.37

(58) Field of Classification Search ........... 137/625.33, 137/625.37, 625.38, 625.39
See application file for complete search history.

(56) References Cited

U.S. PATENT DOCUMENTS

| | | | |
|---|---|---|---|
| 2,104,039 A * | 1/1938 | Hunter ..................... 251/359 |
| 3,513,864 A | 5/1970 | Self |
| 3,529,628 A | 9/1970 | Cummins |
| 3,540,484 A * | 11/1970 | Brown et al. ................. 138/43 |
| 3,722,854 A | 3/1973 | Parola |
| 3,776,278 A | 12/1973 | Allen |
| 3,780,767 A | 12/1973 | Borg et al. |
| 3,813,079 A | 5/1974 | Baumann et al. |
| 3,917,221 A | 11/1975 | Kubota et al. |
| 3,921,668 A | 11/1975 | Self |
| 3,990,475 A | 11/1976 | Myers |
| 4,004,613 A | 1/1977 | Purton et al. |
| 4,041,982 A | 8/1977 | Lindner |
| 4,108,210 A | 8/1978 | Luthe et al. |
| 4,149,563 A | 4/1979 | Seger |
| 4,221,037 A | 9/1980 | Seger |
| 4,249,574 A | 2/1981 | Schnall et al. |
| 4,258,750 A | 3/1981 | Schnall et al. |
| 4,279,274 A | 7/1981 | Seger |
| 4,375,821 A | 3/1983 | Nanao |
| 4,397,331 A | 8/1983 | Medlar |
| 4,429,714 A | 2/1984 | Hughes et al. |
| 4,473,210 A | 9/1984 | Brighton |
| 4,479,509 A | 10/1984 | Dear et al. |
| 4,567,915 A | 2/1986 | Bates et al. |
| RE32,197 E | 7/1986 | Self |
| 4,617,963 A | 10/1986 | Stares |
| 4,671,321 A | 6/1987 | Paetzel et al. |
| 4,860,993 A | 8/1989 | Goode |
| 5,018,703 A | 5/1991 | Goode |
| 5,090,450 A | 2/1992 | Pelech et al. |

(Continued)

FOREIGN PATENT DOCUMENTS

FR    2 306 390    3/1975

(Continued)

OTHER PUBLICATIONS

Body S/A Construction, SD CH3000. 41005 Series, Mar. 2002.

(Continued)

*Primary Examiner*—John Fox
(74) *Attorney, Agent, or Firm*—Fish & Richardson P.C.

(57) ABSTRACT

Fluid flow regulation may be achieved by a system including a housing, a first flow throttling area, and a second flow throttling area. The housing includes a flow inlet port, a flow outlet port, and a passage between the ports. The first flow throttling area is in the passage, and the second flow throttling area is movably positionable proximate the first flow throttling area to facilitate fluid flow regulation, the second flow throttling area restricting flow more than the first flow throttling area. The second flow throttling area primarily regulates flow when flow is low, and the first flow throttling area primarily regulates flow when flow is high.

12 Claims, 6 Drawing Sheets

U.S. PATENT DOCUMENTS

| | | |
|---|---|---|
| 5,732,738 A | 3/1998 | Graham |
| 5,819,803 A | 10/1998 | Lebo et al. |
| 5,964,248 A | 10/1999 | Enarson et al. |
| 6,095,196 A | 8/2000 | McCarty et al. |
| 6,394,134 B1 | 5/2002 | Kwon |

FOREIGN PATENT DOCUMENTS

| | | |
|---|---|---|
| FR | 75 08565 | 10/1976 |
| GB | 2 279 131 A | 12/1994 |
| GB | 2 285 673 A | 7/1995 |

OTHER PUBLICATIONS

Bulletin, 51.2:EH(20), p. 3, 1984.
Product Bulletin, 51.2:EH, EH and EHA Valves, May 2003.
International Search Report for PCT/US2004/023387, mailing date Nov. 5, 2004, 4 pages.

* cited by examiner

FLUID FLOW REGULATION

TECHNICAL FIELD

This description relates to fluid flow, and more particularly, to fluid flow regulation.

BACKGROUND

The throttling process of a control valve produces sound that is often at levels too loud for surrounding personnel. To reduce this noise level, control valves sometimes include specially-designed throttling trim in the lower portions of the valve cage. The trim typically uses small flow passages, which may be tortuous. The passages are used to shift frequencies and, if tortuous, to reduce velocities and, hence, amplitude. Because of the resultant higher frequencies, and possibly lower amplitude, the noise level is reduced.

SUMMARY

Techniques are provided for fluid flow regulation. In one general aspect, a system for fluid flow regulation includes a first flow throttling device and a second flow throttling device. The first flow throttling device includes a first flow throttling area, and the second flow throttling device is operable to move within the first flow throttling device to facilitate flow regulation. The second flow throttling device includes a second flow throttling area that restricts flow more than the first flow throttling area. In certain implementations, the second flow throttling area includes tortuous passages. The second flow throttling area primarily regulates flow when the second flow throttling device is beginning to allow flow, and the first flow throttling area primarily regulates flow when the second flow throttling device is close to allowing full flow.

Particular implementations may include a housing having a flow inlet port and a flow outlet port. The center-line of the flow outlet port and/or the flow outlet port may be proximate the first flow throttling area.

In some implementations, the first flow throttling device is a cylindrical cage, the second flow throttling device is a cylindrical plug, and the second flow throttling area is proximate the first flow throttling area. The plug may include a body, a peripheral wall extending from the body, and a plurality passages in the wall, the passages forming the second flow throttling area.

In particular implementations, at least part of the second flow throttling area is not proximate the first flow throttling area when the second flow throttling device is close to allowing full flow.

In certain implementations, at least part of the second flow throttling area is proximate the first flow throttling area when the second flow throttling device is beginning to allow flow.

In some implementations, the first flow throttling area includes a series of windows. The windows may taper toward the full flow position of the second flow throttling device.

In another general aspect, a system for fluid flow regulation includes a housing, a first flow throttling area, and a second flow throttling area. The housing includes a flow inlet port, a flow outlet port, and a passage between the ports. The center-line of the flow outlet port and/or the center-line of the flow inlet port may be proximate the first flow throttling area. The first flow throttling area is in the passage, and the second flow throttling area is movably positionable proximate the first flow throttling area to facilitate fluid flow regulation, the second flow throttling area restricting flow more than the first flow throttling area. The second flow throttling area primarily regulates flow when flow is low, and the first flow throttling area primarily regulates flow when flow is high.

In certain implementations, at least part of the second flow throttling area is not proximate the first flow throttling area when flow is high. In some implementations, at least part of the second flow throttling area is proximate the first flow throttling area when flow is low.

In particular implementations, the first flow throttling area includes a series of windows. The windows may taper.

In another general aspect, a method for fluid flow regulation includes regulating flow primarily with a flow throttling area of a first flow throttling device when flow is low and regulating flow primarily with a flow throttling area of a second flow throttling device when flow is high, the flow throttling area of the first flow throttling device restricting flow less than the flow throttling area of the second flow throttling device.

Particular implementations may include regulating flow with the flow throttling area of the first flow throttling device and the flow throttling area of the second flow throttling device when the valve flow is moderate.

In certain implementations, at least part of the flow throttling area of the first flow throttling device is not proximate the flow throttling area of the second flow throttling device when flow is high. In some implementations, at least part of the flow throttling area of the first flow throttling device is proximate the flow throttling area of the second flow throttling device when flow is low.

In another general aspect, a system for fluid flow regulation includes a housing, a cylindrical cage, and a cylindrical plug. The housing includes an inlet port, an outlet port, and a passage between the inlet port and the outlet port, the inlet port and the outlet port having respective center-lines. The cage is located in the passage and includes a first flow throttling area having a plurality of windows that taper toward the top of the housing, wherein the center-line of the inlet port and the center-line of the outlet port are proximate the first flow throttling area. The plug is operable to move within the cage to facilitate fluid flow regulation and includes a body and a wall extending from the body, the wall including passages that form a second flow throttling area that restricts flow more than the first flow throttling area. At least part of the second flow throttling area is proximate the first flow throttling area and primarily regulates flow when the plug is beginning to allow flow. At least part of the second flow throttling area is not proximate the first flow throttling area and the first flow throttling area primarily regulates flow when the second flow throttling device is close to allowing full flow.

The details of one or more implementations of the invention are set forth in the accompanying drawings and the description below. Other features of the invention will be apparent from the description and drawings, and from the claims.

DESCRIPTION OF DRAWINGS

Like reference symbols in the various drawings indicate like elements.

DETAILED DESCRIPTION

Fluid flow regulation may be achieved by a valve that uses plug trim to primarily regulate flow when the valve is beginning to allow flow and cage windows to primarily regulate flow when the valve is close to allowing full flow. This is useful for controlling noise for low flow requirements while still achieving large flow requirements. Fluid flow regulation, however, may be achieved by a variety of other techniques.

Figure 1A:
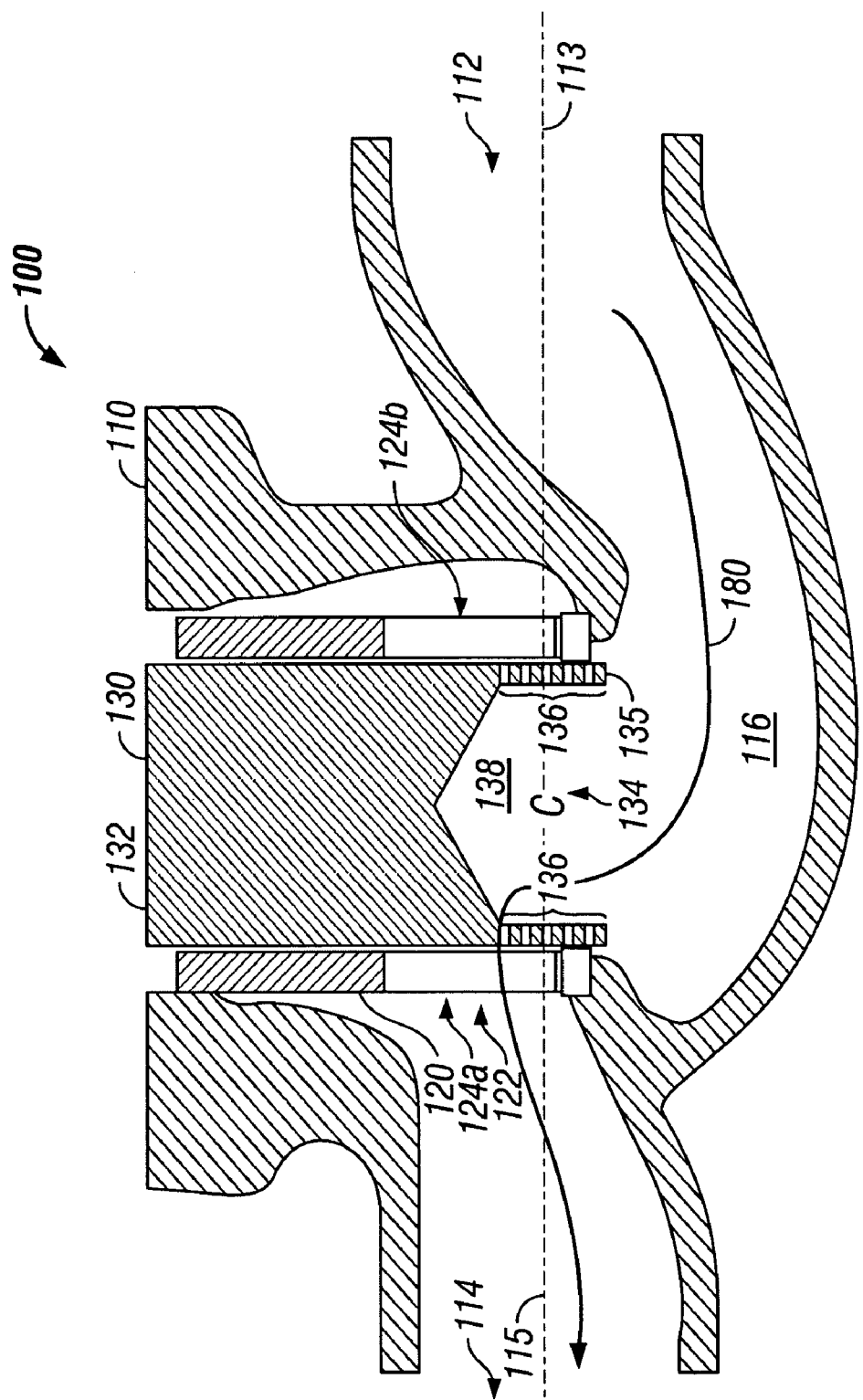
FIGS. 1A–C are cross-section views a system for fluid flow regulation.
Figure 1B:
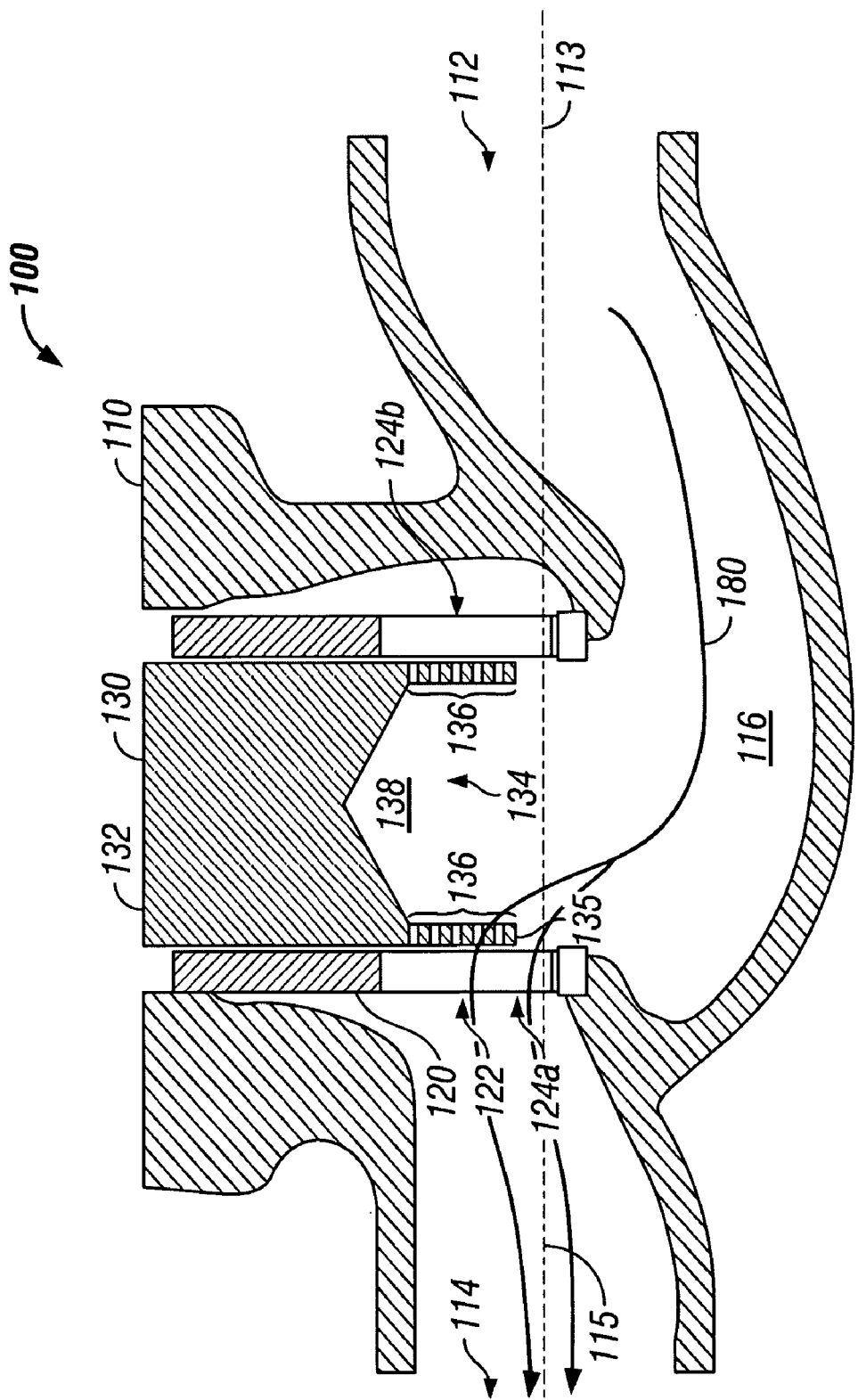
Figure 1C:
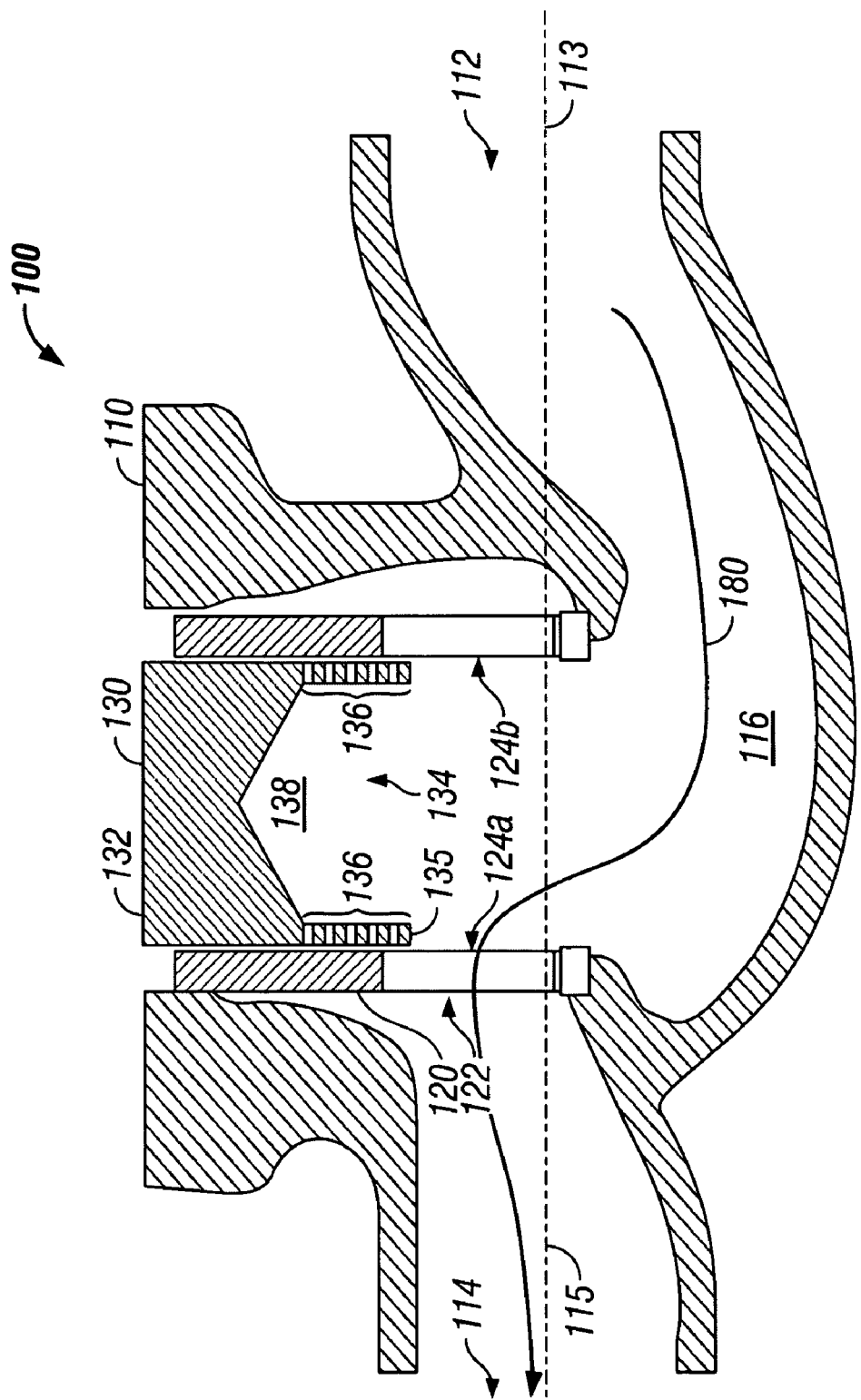

FIGS. 1A–C illustrate a system 100 for fluid flow regulation. In general, system 100 includes a housing 110, a first flow throttling device 120, and a second flow throttling device 130. First flow throttling device 120 and second flow throttling device 130 are configured such that second flow throttling device 130 primarily regulates flow, indicated by arrow 180, through system 100 when the system is beginning to allow flow, and first flow throttling device 120 primarily regulates flow through system 100 when the system is close to allowing full flow. Between these stages, flow may be regulated by a combination of first flow throttling device 120 and second flow throttling device 130. As illustrated, system 100 is part of a valve. However, it could be part of any other appropriate device for regulating fluid flow.

In more detail, housing 110 includes an inlet port 112, an outlet port 114, and a passage 116 between the inlet port and the outlet port. As their names imply, inlet port 112 is where flow enters housing 110, and outlet port 114 is where flow exits housing 110. The flow may be composed of liquid, gas, and/or any other appropriate type of fluid. Furthermore, flow direction may be reversed, depending on the application. Inlet port 112 has a centerline 113, and outlet port 114 has a centerline 115. In the illustrated system, centerline 113 and centerline 115 are substantially aligned, although they need not be so in other implementations. Housing 110 may be composed of metal, plastic, composite, and/or any other appropriate material.

First flow throttling device 120, which may, for example, be a cage, is coupled to housing 110 so that first flow throttling device 120 moves little, if any, relative to housing 110 during operation. In certain implementations, first flow throttling device 120 may be removably coupled to the housing to allow for replacement and/or repair.

First flow throttling device 120 includes a flow throttling area 122. In this implementation, first flow throttling device 120 is cylindrical in shape, and flow throttling area 122 is composed of a series of windows 124 around the periphery of the device. The total area of the windows may be between 80% to 100% of the area of outlet port 114. Thus, if there are four windows, each window may have an area of between approximately 20% to 25% of the outlet port area. In other implementations, however, flow throttling area 122 may have any other appropriate shape. First flow throttling device 120 may be composed of metal, plastic, composite, and/or any other appropriate material.

Second flow throttling device 130, which may, for example, be a plug, is sized so that it fits within first flow throttling device 120 and may be movably positioned therein. Second flow throttling device 130 includes a body 132 and a flow throttling area 134. Flow throttling area 134 includes a wall 135 extending from body 132 and a plurality of passages 136 in wall 135. Flow 180 may pass through passages 136. The total area of passages 136 is substantially less than the total area of flow throttling area 122. In particular implementations, the total area of passages 136 is approximately 50% of the total area of windows 124. The amount of area used at any one time, however, depends on the position of first flow throttling device 120. For instance, the amount of flow throttling area 134 in use may be between 1% to 50% of flow throttling area 122. Flow throttling area 134 may offer over 500 times the flow resistance of flow throttling area 122. Passages 136 may or may not be tortuous and/or staged. In other implementations, however, flow throttling area 134 may have any appropriate shape, as long as the resistance of flow throttling area 134 is greater than the resistance of flow throttling area 122. Second flow throttling device 130 also includes a recess 138. Recess 138 reduces the mass of second flow throttling device 130 and, hence, raises its harmonic frequency, which assists in reducing noise. Second flow throttling device 130 may be composed of metal, plastic, composite, and/or any other appropriate material and may be actuated by any appropriate device (e.g., hydraulic, pneumatic, or electric).

In operation, when second flow throttling device 130 begins to allow flow, illustrated best by FIG. 1A, flow throttling area 134 primarily regulates flow. In fact, in the illustrated example, flow is regulated almost exclusively by flow throttling area 134. That is, flow throttling area 122 does not place any appreciable pressure drop on the flow at this stage. Thus, in this stage, flow is raised in frequency, and a large pressure drop occurs across system 100. In certain implementations, flow throttling area may allow between 1% to 50% of the full flow, depending on valve position.

As second flow throttling device 130 allows more flow, illustrated best in FIG. 1B, system 100 regulates flow with a combination of flow throttling area 122 and flow throttling area 134. Thus, in this stage, some of the flow is raised in frequency and experiences a large pressure drop, but some of the flow experiences a lower pressure drop. In particular implementations, flow throttling area 122 and flow throttling area 134 may regulate flow together up to 99% of the full flow.

As second flow throttling device 130 begins to near its fully open position, illustrated best in FIG. 1C, system 100 primarily regulates flow with flow throttling area 122. In fact, in the illustrated example, flow is regulated almost exclusively by flow throttling area 122. Thus, in this stage, the flow is large, and the pressure drop is small. In particular implementations, flow throttling area 122 may take almost 100% of the full flow when device 130 is close to being fully open.

System 100 has a variety of features. For example, low-noise operation may be achieved at low flow levels while still allowing large capacity flow at high flow levels. In fact, the capacity at high flow levels may be substantially higher than in similar-type flow regulation devices. This is due to the high-capacity throttling area being opposite the fully open position of first flow throttling device 130. Moreover, this is due to the high-capacity throttling area being proximate the center-line of the inlet port and the center-line of the outlet port. In particular implementations, for instance, an eight inch valve can achieve flow rates of over 700 cv with a lift of 3.5 inches and achieve low noise performance when the valve is beginning to allow flow. Additionally, the high flow levels have reduced noise because the flow deviates less from a straight-line path between the inlet port and the outlet port.

In certain implementations, windows 124 may taper towards the fully open position of second flow throttling device 130. The tapering assists in concentrating flow low in the cage and, hence, closer to the center-line of the ports.

Although FIGS. 1A–C illustrate a system for fluid flow regulation, other implementations may include less, more, and/or a different arrangement of components. For example, a system may include an actuator for second flow throttling device 130. As another example, a system may contain a smaller first flow throttling area, as long as the first flow throttling area restricts flow less than the second flow throttling area. As an additional example, a system may not have the centerlines of both the inlet port and the outlet port being proximate the high capacity throttling area of the second flow throttling device and/or being substantially aligned.

Figure 2A:
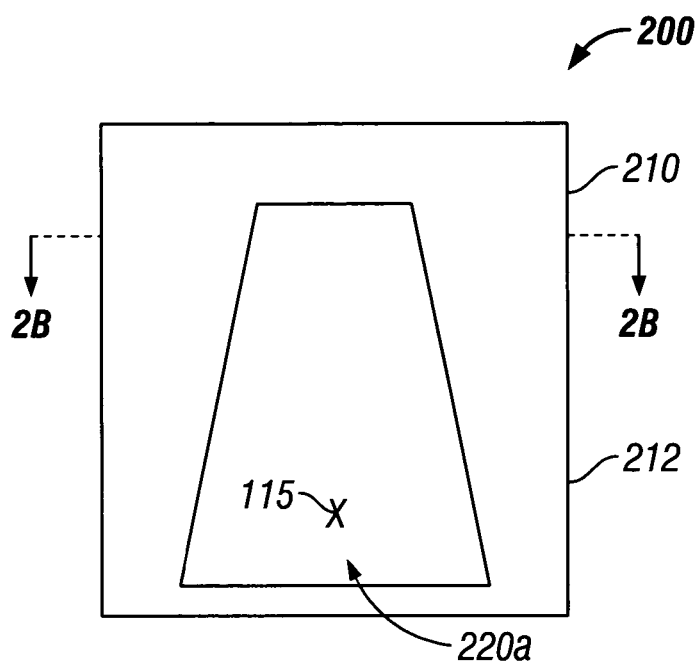
FIGS. 2A–B illustrate a flow throttling device for the system in FIGS. 1A-C.
Figure 2B:
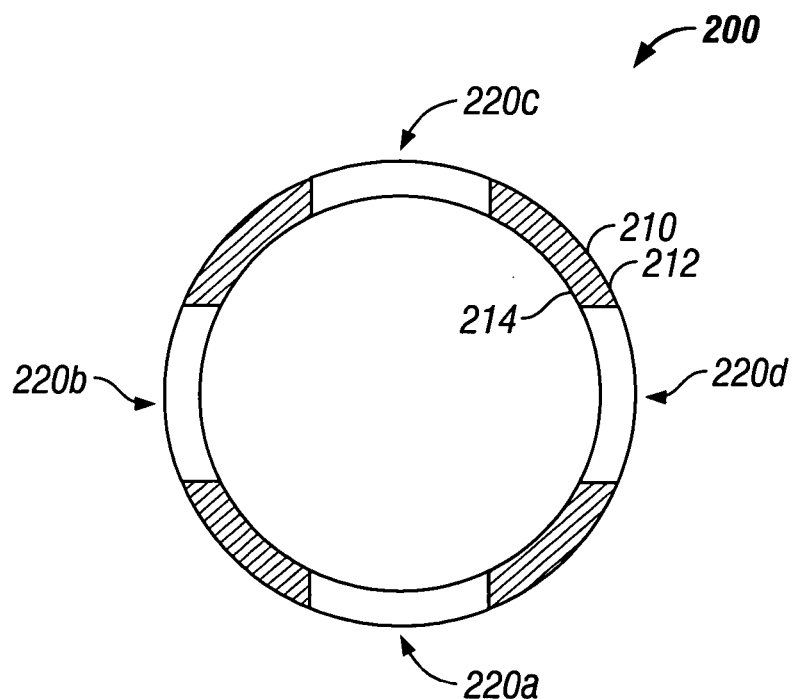

FIGS. 2A–B illustrate a flow throttling device 200 for system 100. Flow throttling device 200 may be similar to flow throttling device 120.

Flow throttling device 200 includes a housing 210. Housing 210 includes an outer wall 212 and an inner wall 214. Inner wall 214 is designed to receive a plug that is movably positionable within housing 210. Flow throttling device 200 also includes windows 220 in housing 210. In the illustrated implementation, device 200 includes four windows. In other implementations, however, device 200 may have any appropriate number of windows.

Windows 220 taper from a low-flow plug position to a high-flow plug position. Thus, in the illustrated implementation, center-line 115 of outlet port 114 is located proximate a relatively large region of windows 220. Having center-line 115 located near a relatively large region of windows 220 is beneficial because a larger portion of the flow exiting flow throttling device 200 is aligned with the outlet port. Additionally, a larger portion of the flow does not have to traverse a longer path in device 200 before exiting device 200, which allows higher flow. Moreover, this allows less disruption to the flow path from the inlet port, leading to a reduction in noise.

Figure 3:
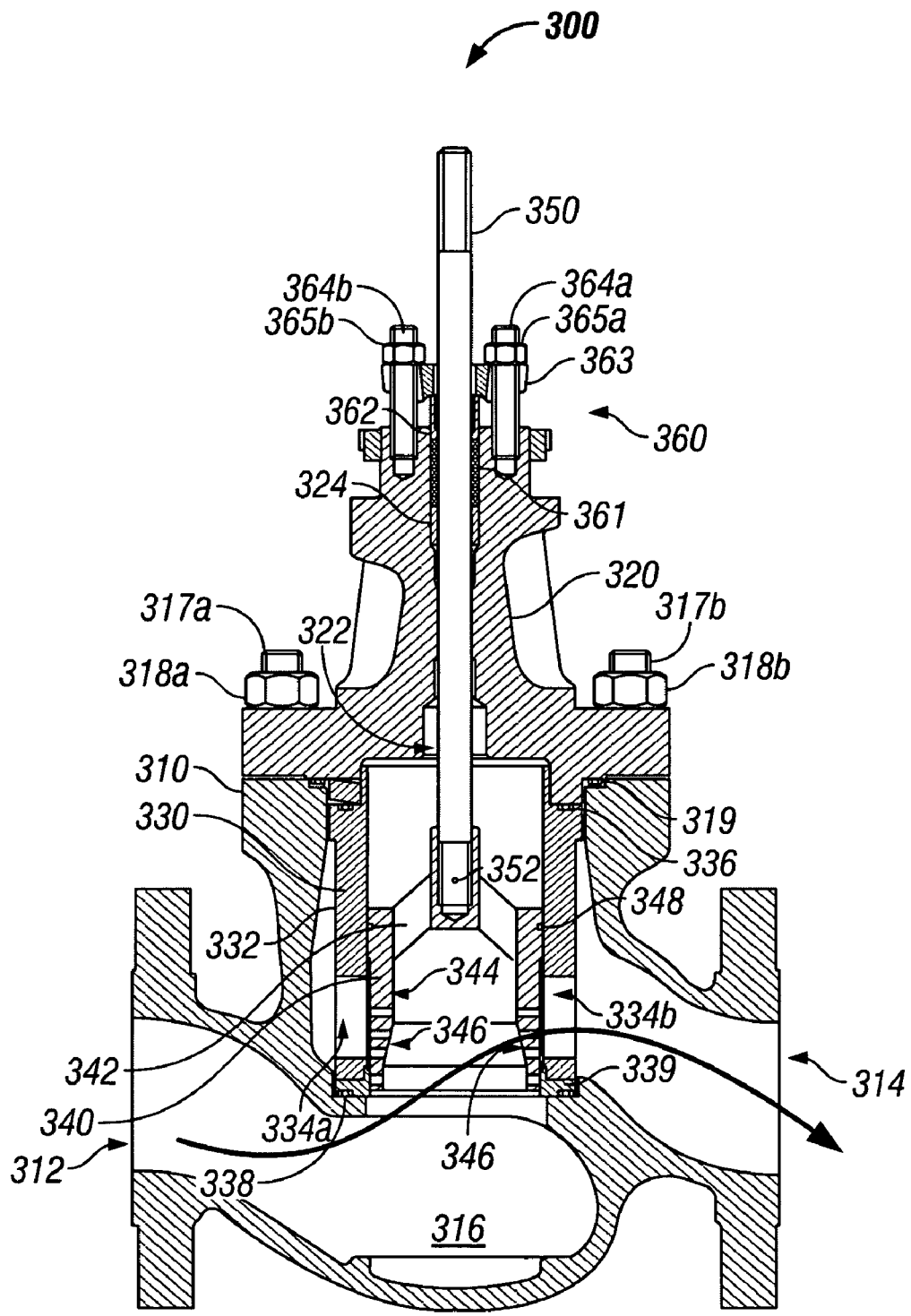
FIG. 3 is a cross-section view of another system for fluid flow regulation.

FIG. 3 illustrates a system 300 for fluid flow regulation. System 300 includes a body 310, a bonnet 320, a cage 330, a plug 340, a stem 350, and a packing assembly 360. As illustrated, system 300 is a balanced valve.

Body 310 includes an inlet port 312, an outlet port 314, and a passage 316 between the inlet port and the outlet port. Note that inlet port 312 and outlet port 314 may be reversed, depending on the application. Body 310 also includes studs 317 that assist in aligning body 310 with bonnet 320. As illustrated, studs 317 also assist in coupling body 310 to bonnet 320 by capturing nuts 318. Body 310 additionally includes a gasket 319 that assists in reducing fluid leakage between body 310 and bonnet 320. Gasket 319 is compressed when bonnet 320 is secured to body 310.

Cage 330 includes a housing 332 and apertures 334 in housing 332, the apertures forming a flow throttling area. Cage 330 also includes a gasket 336 to reduce fluid leakage between bonnet 320 and cage 330, and a gasket 338 and a seat ring 339 to reduce fluid leakage between cage 330 and body 310. Gasket 336, gasket 338, and seat ring 339 are compressed when bonnet 320 is secured to body 310.

Plug 340 includes a body 342 and a wall 344 extending therefrom. Wall 344 contains numerous passages 346, the passages forming a flow throttling area. Passages 346 restrict fluid flow more than apertures 334, and may be moved, at least in part, in the area proximate apertures 334 to allow high flow. Passages 346 may also raise the frequency of the flow. Plug 340 also include a gasket 348 to reduce fluid leakage between plug 340 and cage 330.

Stem 350 movably positions plug 340 in cage 330. Stem 350 includes a pin 352 for coupling stem 350 to plug 340. Stem 350 may be actuated by hydraulic, pneumatic, electric, or other appropriate mechanisms.

Bonnet 320 includes an aperture 322 into which a portion of plug 340 can enter when lifted. Bonnet 320 also includes a bushing 324 for stem 350.

Packing assembly 360 includes packing 361 and packing follower 362. Packing assembly 360 also includes a packing flange 363 with packing studs 364 extending therethrough. Packing studs 364 engage bonnet 320 and are secured to the packing assembly by nuts 365.

Figure 4:
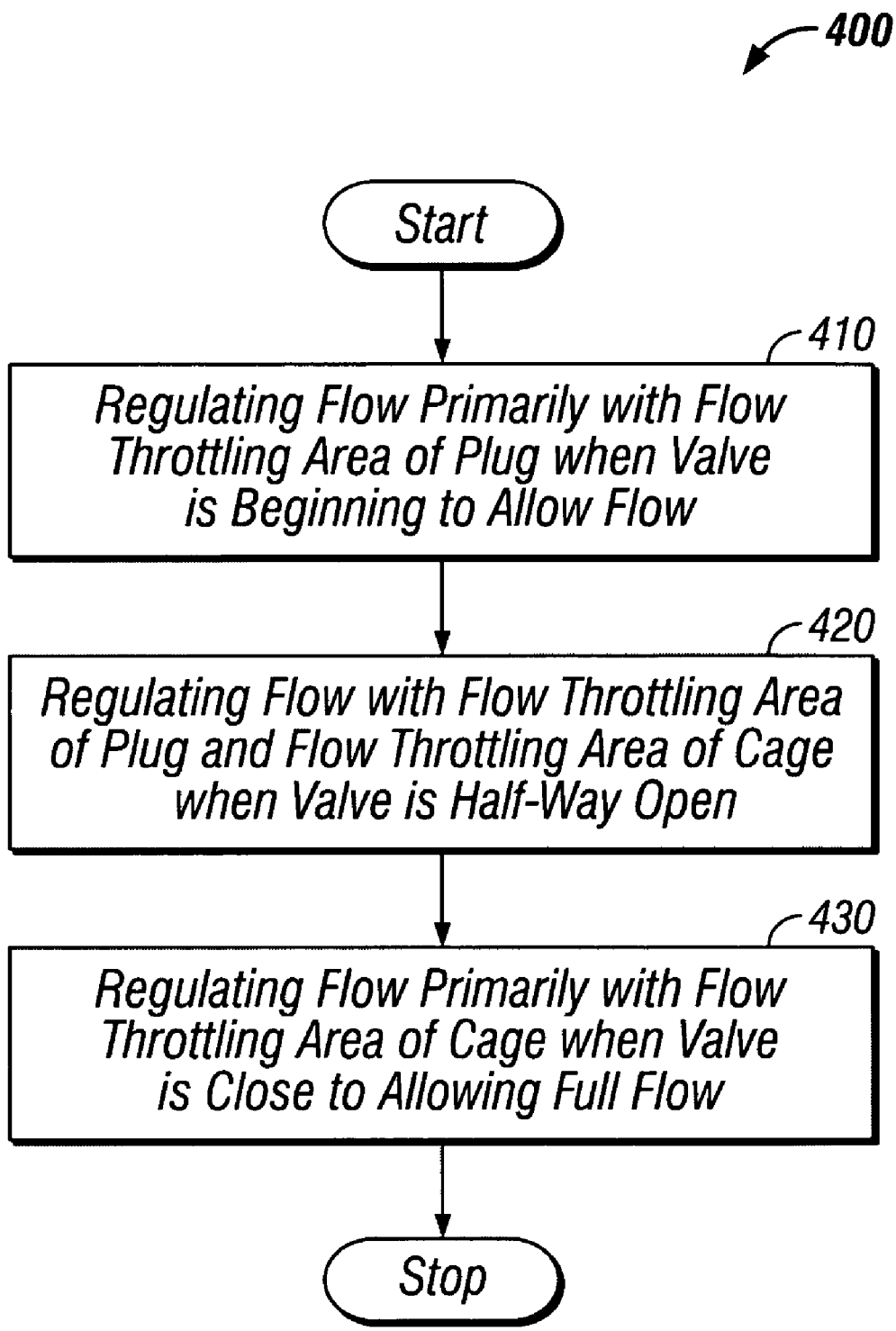
FIG. 4 is a flow chart illustrating a process for fluid flow regulation.

FIG. 4 illustrates a process 400 for fluid flow regulation. The process may be implemented by a system similar to system 100 in FIG. 1.

The process begins with regulating flow primarily with a flow throttling area of a plug when a valve is beginning to allow flow (function block 410). The flow throttling area of the plug may, for example, be a wall that extends from the body of the plug and that contains a number of passages. At least part of the flow throttling area of the plug may be proximate the flow throttling area of a cage at this stage of the process.

The process continues with regulating flow with the flow throttling area of the plug and a flow throttling area of a cage when the valve is half-way open (function block 420). The flow throttling area of the plug restricts flow more than the flow throttling area of the cage. The flow throttling area of the cage may, for example, be a series of windows and, hence, restrict flow substantially less than the flow throttling area of the plug. At this stage of the process, at least part of the flow is proceeding through the flow throttling area of the cage only and at least part of the flow is proceeding through the flow throttling area of the plug and the flow throttling area of the cage. The flow throttling area of the plug may be proximate the flow throttling area of the cage at this stage.

The process continues with regulating flow primarily with the flow throttling area of the cage when the valve close to allowing full flow (function block 430). At least a portion of the flow throttling area of the plug may not be proximate the flow throttling area of the cage at this stage of the process.

Although FIG. 4 illustrates one implementation of a process for fluid flow regulation, other implementations may include fewer, more, and/or a different arrangement of operations. For example, flow may not be regulated with the flow throttling area of the plug and the flow throttling area of the cage when the plug is half-way open. Instead, for example, it may be regulated primarily with the flow throttling area of the cage at this stage. As another example, the flow may be regulated at one stage for a substantial period of time before proceeding to another stage. As a further example, flow may be regulated with the flow throttling area of the plug and the flow throttling area of the cage when the plug is close to allowing full flow.

A number of implementations have been described. Other implementations are within the scope of the following claims.

What is claimed is:

1. A system for fluid flow regulation, the system comprising:
   a first flow throttling device comprising a first flow throttling area; and
   a second flow throttling device operable to move within the first flow throttling device to facilitate flow regulation, the second flow throttling device comprising a second flow throttling area that restricts flow more than the first flow throttling area, the second flow throttling area primarily regulating flow when the second flow throttling device is beginning to allow flow, and the first flow throttling area primarily regulating flow when the second flow throttling device is close to allowing full flow;

wherein the first flow throttling area includes a plurality of windows, the windows tapering from a broad first end to a narrower second end, the windows oriented such that the first broad end is proximate the second throttling area when the second flow throttling device is beginning to allow flow.

2. The system of claim 1, wherein the second flow throttling area comprises tortuous passages.

3. The system of claim 1, further comprising a housing having a flow inlet port and a flow outlet port.

4. The system of claim 3, wherein the center-line of the flow outlet port is proximate the first flow throttling area.

5. The system of claim 3, wherein the center-line of the flow inlet port is proximate the first flow throttling area.

6. The system of claim 3, wherein the center-line of the flow inlet port and the center-line of the flow outlet port are proximate the first flow throttling area.

7. The system of claim 1, wherein the first flow throttling device comprises a cylindrical cage, the second flow throttling device comprises a cylindrical plug, and the second flow throttling area is proximate the first flow throttling area.

8. The system of claim 7, wherein the plug comprises a body, a peripheral wall extending from the body, and a plurality passages in the wall, the passages forming the second flow throttling area.

9. The system of claim 1, wherein at least part of the second flow throttling area is withdrawn from proximity to the first flow throttling area when the second flow throttling device is close to allowing full flow.

10. The system of claim 1, wherein at least part of the second flow throttling area is proximate the first flow throttling area when the second flow throttling device is beginning to allow flow.

11. The system of claim 3, wherein a first total area of the plurality of windows is between about 80 percent and 100 percent of a second total area of the flow outlet port.

12. The system of claim 11, wherein the second flow throttling area comprises passages through a wall of the second flow throttling device and a third total area of the passages is approximately 50 percent of the first total area.

* * * * *